(12) United States Patent
Mills et al.

(10) Patent No.: US 7,524,197 B2
(45) Date of Patent: Apr. 28, 2009

(54) DOCKING STATION FOR PORTABLE MEDIA PLAYER OR STORAGE DEVICE

(75) Inventors: Stephen B. Mills, Atkinson, NH (US); Charles J Burout, III, Bedford, NH (US)

(73) Assignee: Brookstone Purchasing, Inc., Merrimack, NH (US)

( * ) Notice: Subject to any disclaimer, the term of this patent is extended or adjusted under 35 U.S.C. 154(b) by 123 days.

(21) Appl. No.: 11/796,924

(22) Filed: Apr. 30, 2007

(65) Prior Publication Data

US 2008/0266783 A1  Oct. 30, 2008

(51) Int. Cl.
*H01R 13/62* (2006.01)
(52) U.S. Cl. .................. 439/131; 439/527; 361/683; 455/90; 381/334; 381/386
(58) Field of Classification Search ............. 439/131, 439/527, 132, 534; 361/683; 455/90; 381/334, 381/386
See application file for complete search history.

(56) References Cited

U.S. PATENT DOCUMENTS

| 3,646,244 | A | * | 2/1972 | Cole ............................ 174/57 |
| 4,091,231 | A | * | 5/1978 | Sotolongo .................... 174/483 |
| 4,551,577 | A | * | 11/1985 | Byrne .......................... 174/57 |
| 4,613,998 | A |   | 9/1986 | Drexhage |
| 4,669,791 | A | * | 6/1987 | Savill ........................... 439/34 |
| 5,335,093 | A | * | 8/1994 | Imoto ......................... 358/487 |
| 5,754,397 | A |   | 5/1998 | Howell et al. |
| 6,231,371 | B1 | * | 5/2001 | Helot .......................... 439/374 |
| 6,341,218 | B1 |   | 1/2002 | Poplawsky et al. |
| 7,095,867 | B2 | * | 8/2006 | Schul et al. ................. 381/334 |
| 2003/0221876 | A1 |   | 12/2003 | Doczy et al. |
| 2006/0250764 | A1 |   | 11/2006 | Howarth et al. |
| 2006/0250767 | A1 | * | 11/2006 | Brophy et al. .............. 361/686 |
| 2006/0291964 | A1 | * | 12/2006 | Wang .......................... 406/12 |
| 2008/0137285 | A1 | * | 6/2008 | Chuang ...................... 361/686 |

OTHER PUBLICATIONS

International Search Report and Written Opinion issued in related International Patent Application No. PCT/US07/21350, dated Oct. 5, 2007. (10 pages).

* cited by examiner

*Primary Examiner*—Gary F. Paumen
(74) *Attorney, Agent, or Firm*—Grossman, Tucker, Perreault & Pfleger

(57) ABSTRACT

A docking station is provided which includes a housing having a receptacle bay and an electrical connector disposed within the receptacle bay. The receptacle bay of the docking station may be configured to receive a plurality of types and/or sizes of portable media players or storage devices therein. The electrical connector may be configured to transmit digital signals from and/or to the portable media player or storage device. The docking station may also include a height adjustment mechanism for adjusting the height of the electrical connector relative to the receptacle bay. A user interface may be provided for controlling the digital signals. Additionally, the docking station may also include an audio output port, a video output port, a USB port, or a combination thereof. Furthermore, the docking station may also include a speaker assembly and/or a video assembly to receive digital signals from the portable media player or storage device.

30 Claims, 11 Drawing Sheets

DOCKING STATION FOR PORTABLE MEDIA PLAYER OR STORAGE DEVICE

TECHNICAL FIELD

The invention relates generally to a docking station and, more particularly, to an improved system for coupling one of a variety of portable media players or storage devices to the docking station.

BACKGROUND OF THE INVENTION

The past several decades have seen remarkable advances in digital media reproduction equipment, particularly equipment that allows a variety of digital media files to be carried or transported with a user from one location to another. Such equipment includes, e.g., equipment for digitally recording, editing, mixing, producing, storing and reproducing digital media or multimedia files, such as without limitation audio tracks, digital images, and videos. A portable multimedia player is a self-reliant electronic device that is capable of storing and playing files in one or more media formats. Data may be typically stored on a hard drive, on a microdrive, or in flash memory.

A main feature of portable multimedia players may include their versatility in being able to load and play different formats of video, audio, and digital images. One example of a brand of portable multimedia players includes iPod® marketed by Apple Computer, Inc. Devices in the iPod® family may include primarily digital audio, video, and multimedia players. A selection of devices in the iPod® family may include, for example, a fifth generation iPod®, IPOD MINI, IPOD NANO, and IPOD SHUFFLE. Each one of the aforementioned iPod® devices may provide different capacities of audio and/or video storage. Additionally, the physical dimensions of each of the iPod® devices may also vary in accordance with user preference.

Most of the currently available portable multimedia players are designed to be highly portable and to allow an individual to carry a relatively large number of digital media files. However, because design of these devices has centered on portability, the manufacturers may tend to limit them so as to present the reproduced media to a user only through monaural or stereo headphones that are plugged into the portable multimedia player device or a small screen housed within the portable multimedia player device. This means that, at best, these players can only be used to reproduce audio tracks, digital images, and/or videos for a limited number of users, such as where one or more splitters are used to allow multiple users to plug headphones into the device. Furthermore, increasing the number of users connected to a single device beyond one or two may limit the portability of the portable multimedia players.

One method alternatively employed by some in the prior art is to allow users to attach a portable multimedia player to a stereo or audio speakers. This allows multiple users to experience audio tracks at the same time. Because the power output of portable multimedia players is typically relatively low, it is frequently advantageous for the speakers to include an amplifier that is powered by an external power source. By way of example, without intending to limit the present invention, some in the prior art have created relatively small, battery powered or alternating current (AC) powered speakers for use with portable multimedia players. Alternatively, others in the prior art use a method of allowing users to connect a portable multimedia player to television or other video device. This allows multiple users to experience digital images or videos simultaneously.

A proliferation of docking stations have been developed to allow connectivity to portable multimedia players such as, for example, the iPod® family of players. These docking stations may include a USB port, an audio output port, or a video output port. In addition, the docking station may be capable of charging the portable multimedia player when connected thereto. U.S. Pat. No. 7,095,867 issued to Schul et al. discloses a portable system capable of receiving audio signals from one or more sources and reproducing the signals via speakers contained therein. The portable system of Schul et al. includes a docking port for receiving an audio device. However, the docking port includes a fixed connector for receiving and communicating with the audio device and may not be able to physically accommodate the wide variety of shapes and sizes of portable multimedia players including, for example, iPod® family of digital audio, video, and multimedia players.

The present invention is directed to a portable audio reproduction system that substantially obviates one or more of the problems due to limitations and disadvantages of the related art. Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

SUMMARY OF THE INVENTION

It is, therefore, one object of the present invention to overcome the deficiencies of the prior art and to provide a docking station for an electronic device including a support surface for supporting a portable media player or storage device and an electrical connector positioned adjacent to the support surface. The electrical connector may be configured to connect to the portable media player or storage device and transmit digital signals thereto and therefrom. The docking station may also include a height adjustment mechanism for adjusting a height of the electrical connector relative to the support surface.

Additionally, another object of the present invention is to address the deficiencies of the prior art and to provide a docking station capable of accommodating various portable multimedia players and storage devices of varying sizes and connector configurations. While, previously, a user needed to use a particular interchangeable insert or dock adapter for each different type or model of portable multimedia player or storage device in order to connect the player or storage device to an electrical connector of user's docking station, the present invention is capable of receiving varied models of portable media players and storage devices in a receptacle bay with an electrical connector without substituting an interchangeable insert each time a different portable media player model is inserted into the docking station. The docking station includes a height adjustment mechanism for adjusting a height of the docking station's electrical connector relative to a floor of the receptacle bay such that the docking station can accommodate different portable media player types at the different heights of the docking station's electrical connector.

In accordance with another disclosed exemplary embodiment, a docking station may include a housing and a support surface disposed within the housing. The docking station may further include an electrical connector extending across the support surface, the electrical connector configured to connect to a portable media player or storage device disposed on a support surface to transmit digital signals from and/or to the portable media player or storage device. A height adjustment mechanism may be provided for adjusting a height of the electrical connector relative to the support surface. The docking station may also include an USB cable fixedly or removably attached to the housing and suitable for connection to a personal computer or other similar electronic device in order to permit data transfer between a portable media player or storage device which is connected to the electrical connector inside the housing of the docking station and the computer or similar electronic device. Moreover, the portable media player or storage device in the docking station may also be charged via the USB cable connection to a computer or similar electronic device. Alternatively, an electrical power cord may be fixedly or removably attached to the housing such that the portable media player or storage device within the housing and connected to the electrical connector may be charged and/or powered.

In accordance with yet another disclosed exemplary embodiment, a method of connecting a portable media player or storage device to a speaker device and/or video screen or liquid crystal display panel may include providing a support surface for supporting a portable media player or storage device and adjusting a first position of an electrical connector extending across the support surface by moving the electrical connector relative to the support surface. The method may further include disposing the portable media player or storage device on the support surface and connecting the portable media player or storage device to the electrical connector at the adjusted position.

In accordance with another disclosed exemplary embodiment, a docking station includes a housing and a receptacle bay disposed within the housing. The receptacle bay may be configured to receive a portable media player or storage device therein. An electrical connector may be provided to extend into the receptacle bay area. The electrical connector may be configured to connect to the portable media player or storage device disposed within the receptacle bay to transmit digital signals to and/or from the portable media player or storage device. The docking station may also include a height adjustment mechanism for adjusting the height of the electrical connector relative to the receptacle bay area. A user interface may be provided for controlling the digital signals. The docking station may also include a speaker assembly configured to receive audio signals from the portable media player or storage device and/or a power source configured to power or charge the portable media player or storage device.

In accordance with yet another disclosed exemplary embodiment, a speaker system may include a means for receiving a portable media player or storage device disposed within the speaker system and a means for transmitting digital signals configured to extend into the receiving means. The receiving means may be configured to connect to the portable media player or storage device. A means for adjusting a position of the receiving means relative to the receiving means may also be provided.

In accordance with yet another disclosed exemplary embodiment, a video system may include a video screen or liquid crystal display, a means for receiving a portable media player or storage device disposed within the video system, and a means for transmitting digital signals configured to extend into the receiving means. The receiving means may be configured to connect to the portable media player or storage device. A means for adjusting a position of the receiving means relative to the receiving means may also be provided.

DETAILED DESCRIPTION OF THE INVENTION

Figure 1:
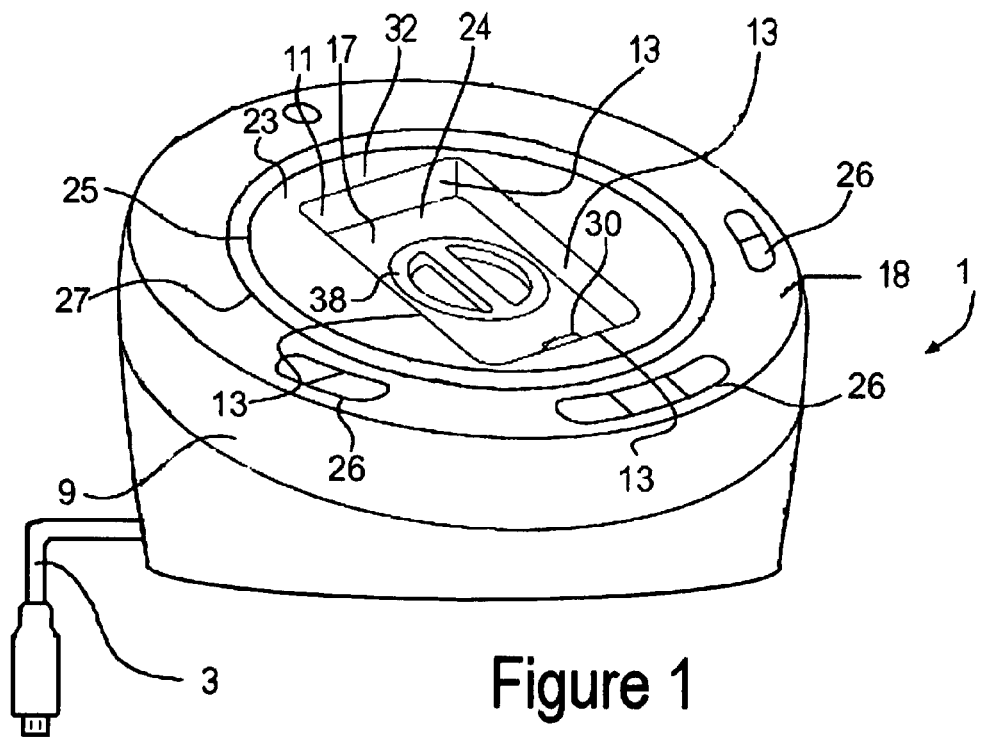
FIG. 1 provides a diagrammatic perspective view of a docking station according to an exemplary disclosed embodiment.

A docking station 1 is illustrated in FIG. 1. The docking station 1 may be useful for mating with one of a variety of portable media players or storage devices. The docking station 1 may include one or more user interface controls 26 for controlling the functions of the portable media player or storage device 29. Mating with one of the portable media player or storage devices 29 may be enabled by electronically coupling, for example, an electrical connector 30 of the docking station 1 with a corresponding receptacle connector of the portable media player or storage device 29. The electrical connector 30 may be configured to transmit digital signals to and/or from the portable media player or storage device 29, to supply power to the portable media player or storage device 29, or to provide both signal transmission and powering functionalities. This may include providing suitable materials and appropriate connection between the electrical connector 30 and an audio device, such as but not limited to an audio speaker, operatively connected to the docking station 1. The docking station 1 may include, for example, a processor (not shown) for receiving and transmitting the aforementioned digital signals accordingly. In one embodiment, the electrical connector 30 may include a standard electronic connector for a portable media player or storage device 29. The aforementioned standard electronic connector may include a male 30-pin connector. Thus, the electrical connector 30 may be configured to be received by a corresponding electrical female receptacle (not shown) of the portable media player or storage device 29.

Figure 6:
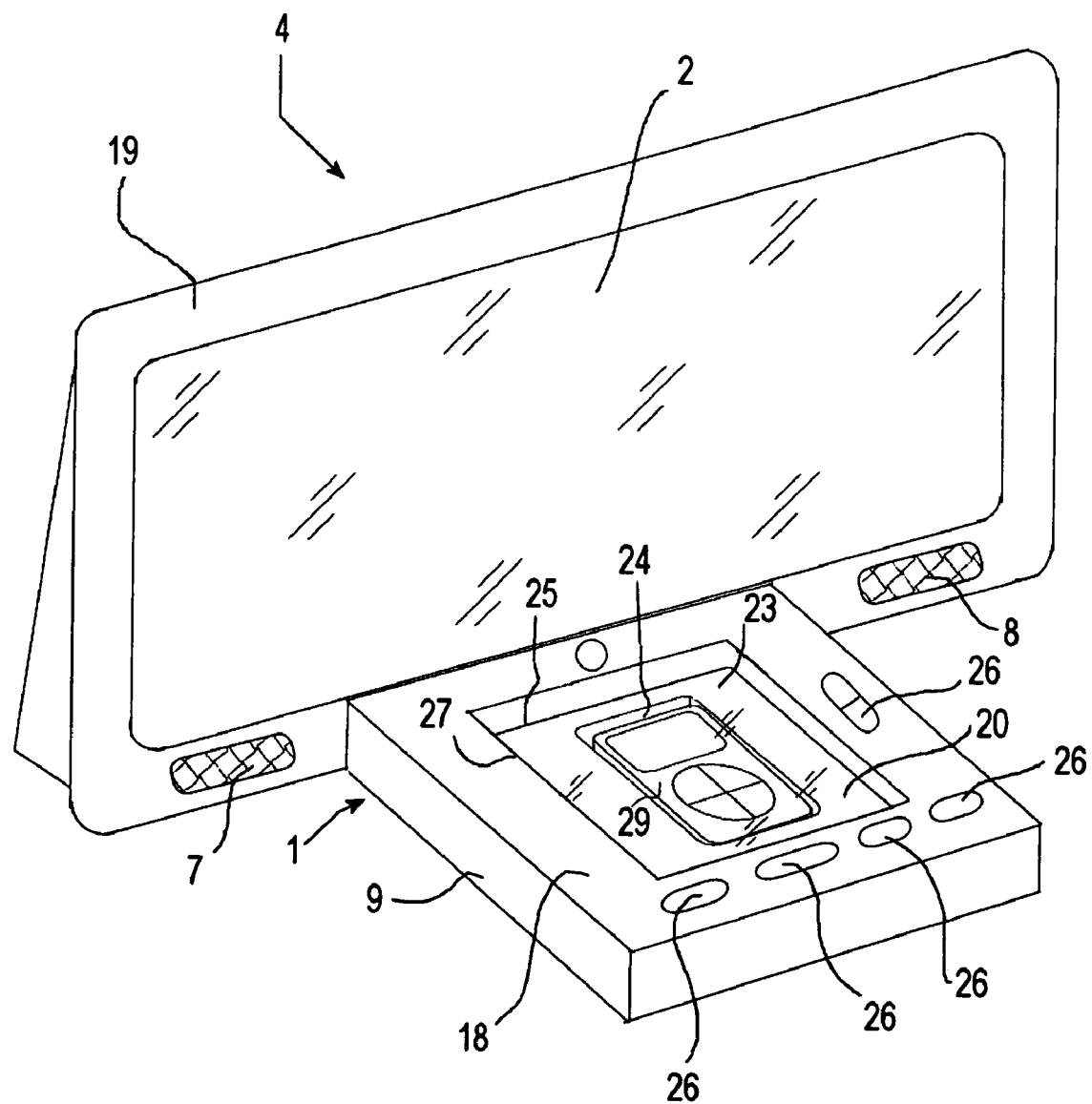
FIG. 6 provides a diagrammatic perspective view of an exemplary portable media player or storage device operably connected with a docking station incorporated into a video system.

Furthermore, the docking station 1 may comprise a top portion 18. The materials of the docking station 1 may generally include blow molded plastic or other suitable materials known in the art. The top portion 18 may further include a housing 9 having a opening 23 therein. The opening 23 may be defined by an inner circumferential edge 25 of the housing 9. The opening 23, may generally provide access to a receptacle housing 32 (FIG. 6). The receptacle housing 32 may be generally disposed within the opening 23 in the top portion 18 of the housing 9. The receptacle housing 32 may include a media device receptacle 24 for receiving one of a variety of portable media player or storage devices 29. The media device receptacle 24 may include a support surface 17 for supporting a portable media player or storage device 29. The support surface 17 may include suitable materials and surface shapes and sizes appropriate for supporting or retaining a portable media player or storage device 29. For example, one embodiment may include a support surface 17 having a detent, curved, concave, textured, or other configuration. In some embodiments, the support surface 17 may be bounded by one or more edge walls 13 as shown, for example, in FIG. 1. Additionally, this disclosed embodiment depicts one edge wall 13 including an end wall 11 generally disposed opposite to a location of the electrical connector 30. In one embodiment, the support surface 17 and edge walls 13 may form a receptacle bay for receiving the portable media player or storage device 29. While edge walls 13 are illustrated in FIG. 1, other embodiments may include fewer or more edge walls 13 in accordance to a preferred design. Also, the edge walls 13 may have a different shape than shown in FIG. 1 and/or include cut-outs providing access by a user's fingers for more easily gripping a portable media player or storage device 29.

Figure 2:
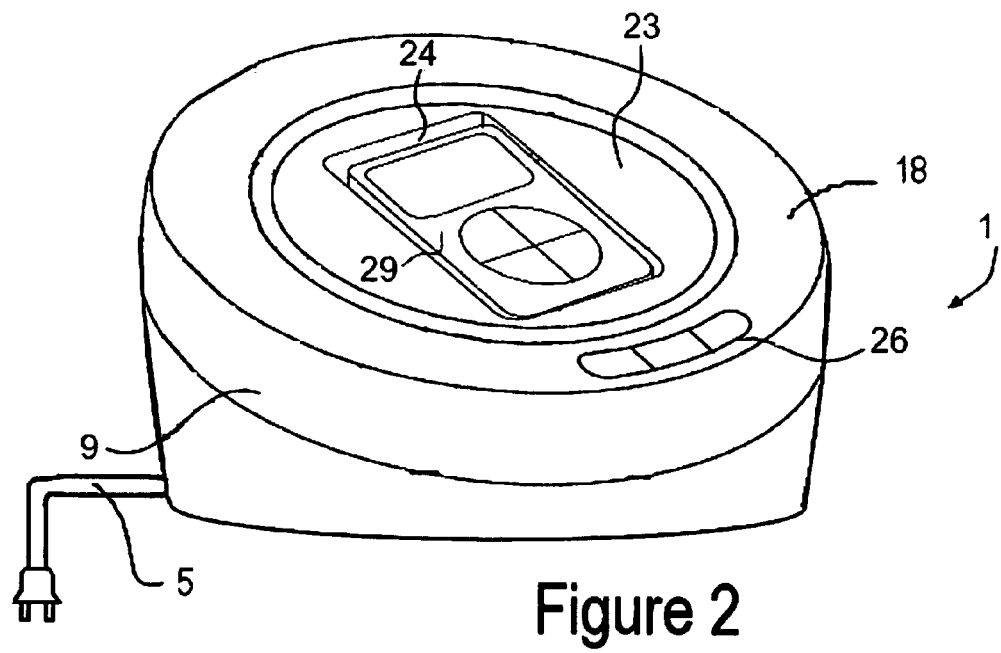
FIG. 2 provides a diagrammatic perspective view of an exemplary portable media player or storage device operatively connected with a second exemplary embodiment of a docking station.

As shown, for instance, in FIG. 2, a portable media player or storage device 29 is disposed in the media device receptacle 24. User interface controls 26 may be disposed, for example, in the housing 9. The user interface controls 26 may be suitably configured to the electrical connector 30 in order to control functions of the portable media player or storage device 29. These functions may include controlling menu items such as "song", "artists", and "genre" selections. Other functions may include playback option controls such as "play", "stop", "fast-forward", "rewind", "next track selection", and "previous track selection." The user interface controls 26 may also operate additional features of the speaker device 10 such as volume control.

The docking station 1 may include an electrical connection for supplying power thereto and/or for transmitting digital signals to and/or from the docking station 1. This may include coupling the electrical connection a power source, a computer, a personal digital assistant, and/or a similar electronic device. The disclosed embodiment of FIG. 1, for example, illustrates a connector cable such as a USB cable 3. When connected to the electrical connector 30, the portable media player or storage device 29, via the USB cable 3, can be charged or powered by the computer, personal digital assistant, or similar electronic device and/or can have data and files transferred between it and the computer, personal digital assistant, or similar electronic device. Alternatively, the embodiment of FIG. 2 depicts a power cord 5 for supplying power to the docking station 1. In one example, the power cord 5 may be suitably configured to provide a DC connection type electrical input. It should be appreciated that any suitable means or connector-type may be utilized by the disclosed docking station 1 in order to provide power thereto. Additionally, the power connector may be suitably configured to power and/or to charge the portable media player or storage device 29 when connected to the electrical connector 30.

Figure 3:
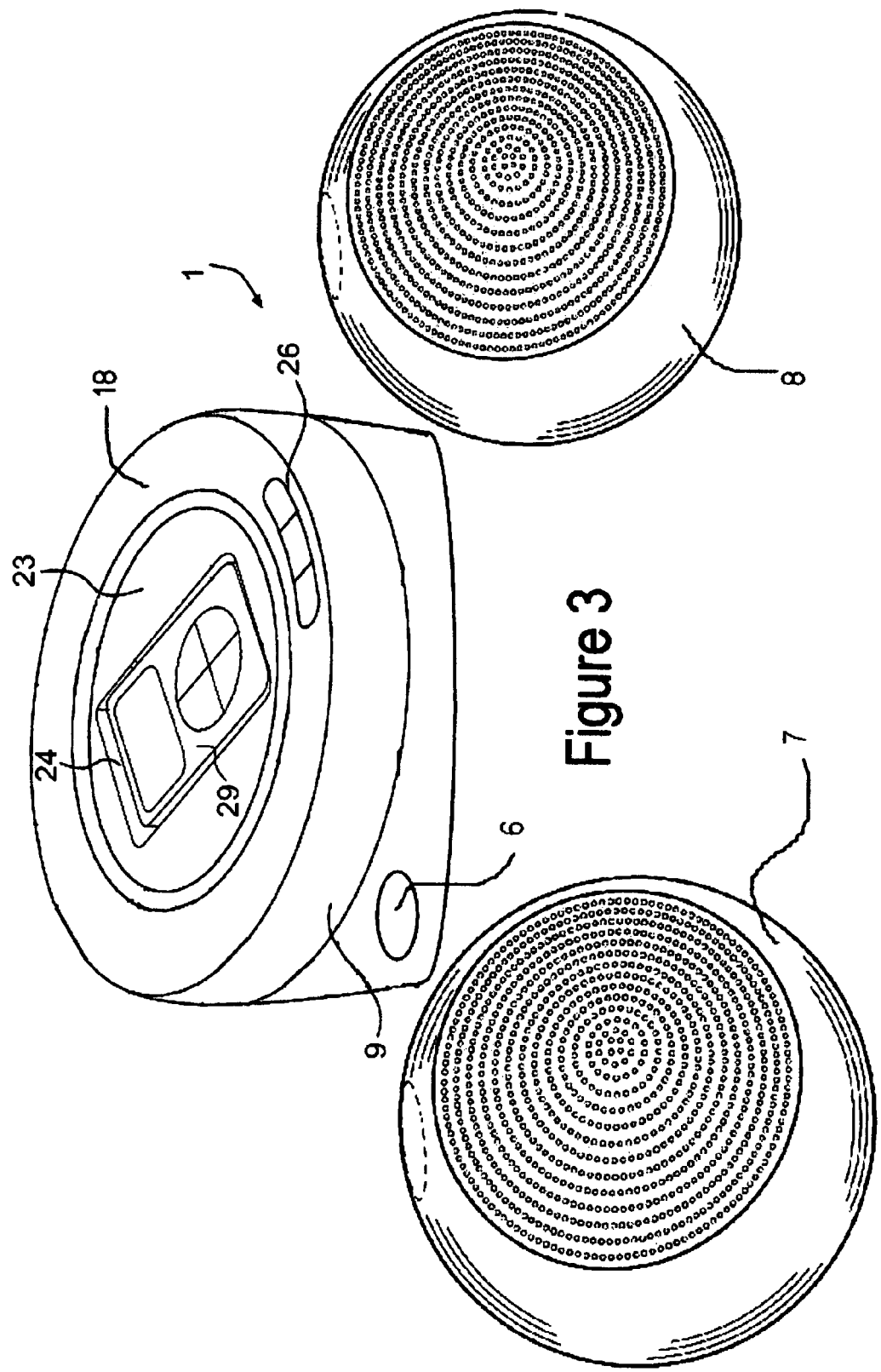
FIG. 3 provides a diagrammatic perspective view of a docking station of FIG. 2 operatively connected to audio speakers.

Turning to FIG. 3, the disclosed embodiment of docking station 1 includes a wireless transmitter 6 for transmitting digital signals to audio devices such as left and right speakers 7, 8 from docking station 1; wherein the digital signals are initially transmitted from a portable media player or storage device 29 to docking station 1 via an electrical connector 30. Alternatively, left and right speakers 7, 8 may be hard-wired to docking station 1. Thus digital signals may be transmitted via the docking station 1 from the portable media player or storage device 29 to left and right speakers 7, 8 creating an acoustical stereo effect. In an alternate preferred embodiment, the top portion 18 of the docking station 1 may also include one or more electrical connections (not shown) for receiving electrical signals from an exterior electronic devices, such as but not limited to audio and/or video players. The top portion 18 may also provide one or more electrical connections (not shown) for transmitting electronic signals to additional exterior electronic devices, such as but not limited to audio speakers, stereo systems, video screens, and/or liquid crystal displays. While one or more electrical connections have been described, for example, as being provided by top portion 18, additional or alternative connection types may also be provided in alternate embodiments. By way of example, these may include video connections for receiving or transmitting video images to the docking station 1.

Figure 4:
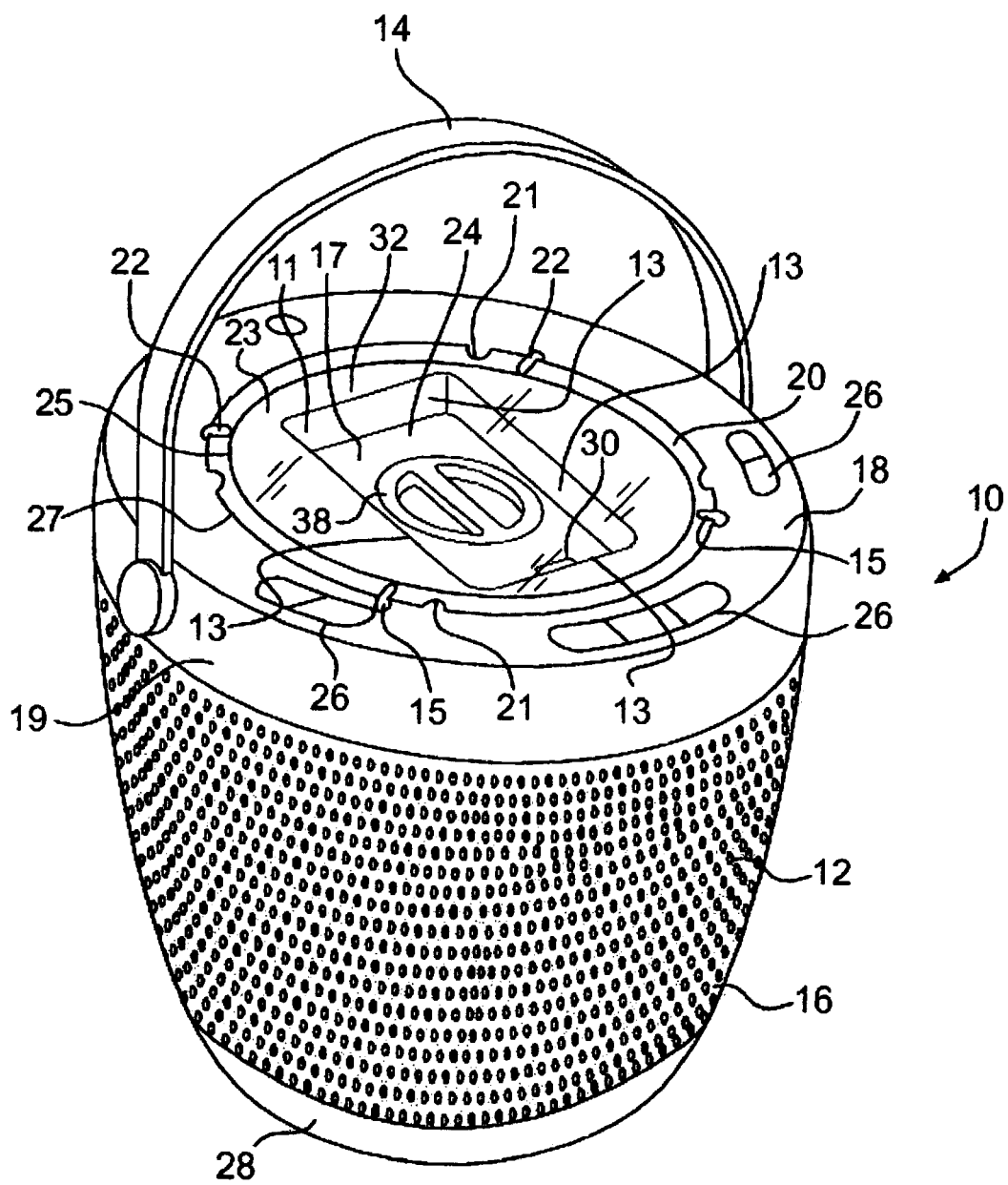
FIG. 4 provides a diagrammatic perspective view of an alternative embodiment of a docking station incorporated into an audio system.

Turning to FIG. 4, an alternative embodiment of docking station 1 is shown operatively connected to at least one speaker or a speaker system. The disclosed embodiment forms a speaker device 10 which may be useful for mating with one of a variety of portable multimedia players such as portable media player or storage devices 29. In one preferred embodiment, speaker device 10 may be portable having, for example, a handle 14 connected thereto in order to transport the speaker device 10 to a preferred location. As with the docking station 1, the speaker device 10 may include one or more user interface controls 26 for controlling the functions of the portable media player or storage devices 29. Mating with one of the portable media player or storage devices 29 may be enabled by electronically coupling, for example, an electrical connector 30 of the speaker device 10 with a corresponding receptacle connector of the portable media player or storage device 29. The electrical connector 30 may be configured to transmit digital signals to and/or from the portable media player or storage device 29 and/or to power or charge the portable media player or storage device 29. This may include providing suitable materials and appropriate connection between the electrical connector 30 and a speaker system of the speaker device 10 including, for example, a processor (not shown) for receiving and transmitting the aforementioned digital signals accordingly. Thus audio signals may be processed and sound waves may be emitted by the speaker system of the speaker device 10. In one embodiment, the electrical connector 30 may include a standard electronic connector for a portable digital media player. The aforementioned standard electronic connector may include a male 30-pin connector. Thus, the electrical connector 30 may be configured to be received by a corresponding electrical female receptacle of the portable media player or storage device 29.

The speaker device 10 may comprise a main body portion 16 having a top portion 18 and a base portion 28 connected thereto. The materials of the main body portion 16 may generally include blow molded plastic or other suitable materials known in the art. In a final assembly, the speaker device 10 may vary in circumference, for example, traversing from the top portion 18, through the main body portion 16, to the base portion 28. The main body portion 16 may house the speaker section 12. In one disclosed embodiment, the speaker section 12 may be configured to extend completely around the circumference of the main body portion 16 to provide sound in a direction of 360° emitted from the speaker device 10. Alternatively, the speaker section 12 may be configured to provide sound in a range of direction between 0° to 360°.

The top portion 18 may further include an exterior cover member 19 having an opening 23 therein. The opening 23 may be defined by an inner circumferential edge 25 of the exterior cover member 19. The carrying handle 14 may be connected to the speaker device 10 at locations including, for example, along sides of the exterior cover member 19. The opening 23, may generally provide access to a receptacle housing 32 (FIG. 6). The receptacle housing 32 may be generally disposed within the top portion 18. The receptacle housing 32 may include a media device receptacle 24 for receiving one of a variety of portable media player or storage devices 29. The media device receptacle 24 may include a support surface 17 for supporting a portable media player or storage device 29. The support surface 17 may include suitable materials and surface shapes and sizes appropriate for supporting or retaining a portable media player or storage device 29. For example, one embodiment may include a support surface 17 having a detent, curved, concave, textured, or other configuration. In some embodiments, the support surface 17 may be bounded by one or more edge walls 13 as shown, for example, in FIG. 4. Additionally, this disclosed embodiment depicts one edge wall 13 including an end wall 11 generally disposed opposite to a location of the electrical connector 30. In one embodiment, the support surface 17 and edge walls 13 may form a receptacle bay for receiving the portable media player or storage device 29. While edge walls 13 are illustrated in FIG. 4, other embodiments may include fewer or more edge walls 13 in accordance to a preferred design. Also, the edge walls 13 may have a different shape than shown in FIG. 4 and/or include cut-outs providing access by a user's fingers for more easily gripping a portable media player or storage device 29.

Figure 5:
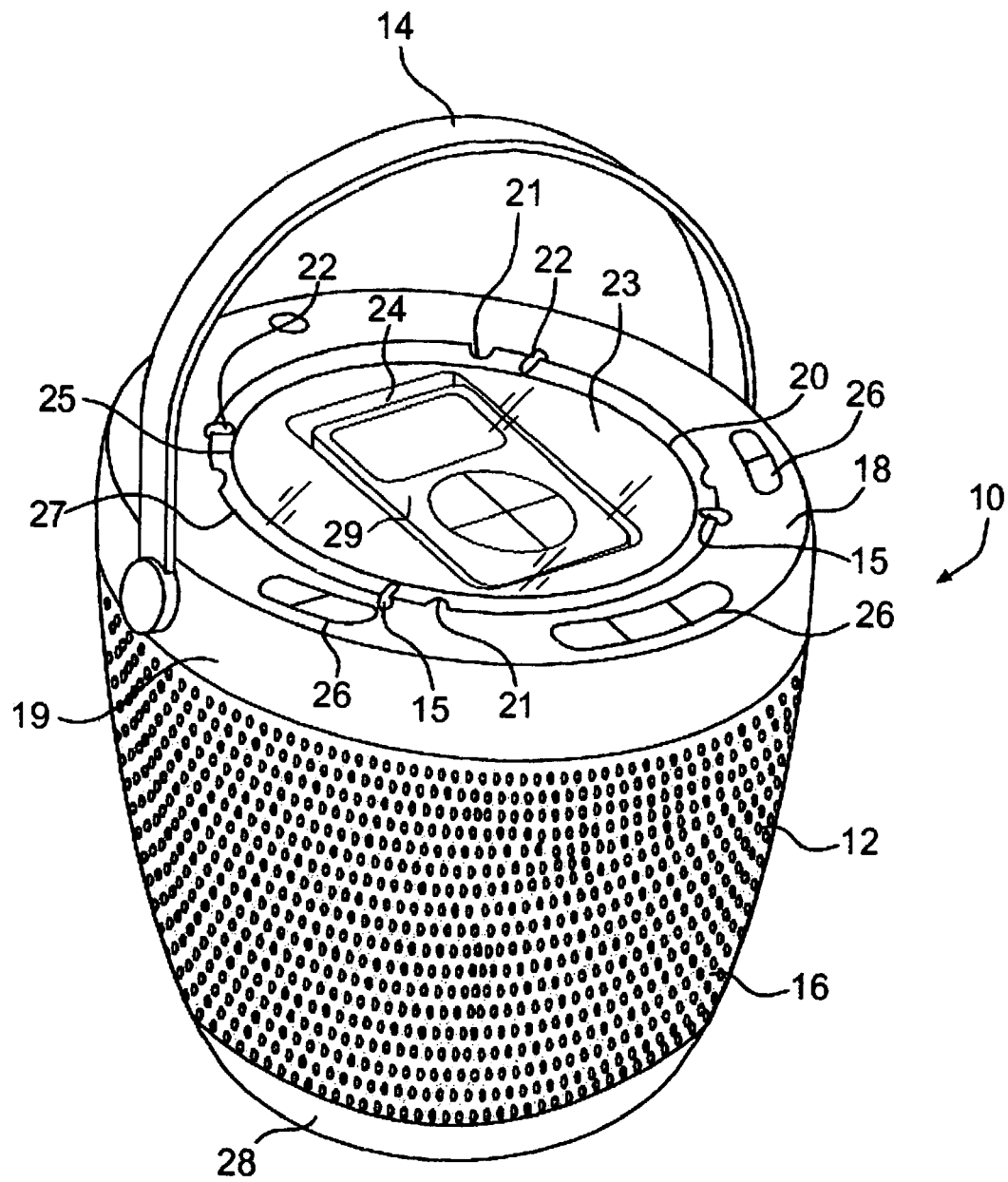
FIG. 5 provides a diagrammatic perspective view of an exemplary portable media player or storage device operatively connected with the audio system of FIG. 4.

As shown, for instance, in FIG. 5, a portable media player or storage device 29 is disposed in the media device receptacle 24. Located therein, a cover member 20 may be fitted over the portable media player or storage device 29 and retained to the speaker device 10. The disclosed embodiment shows an outer circumferential edge 27 of the cover member 20 extending past the inner circumferential edge 25 of the exterior cover member 19. In one disclosed embodiment, the cover member 20 may be completely, or at least partially, made of a transparent material to form a window. This may allow a video component of the portable media player or storage device 29 to remain visible when covered and sealed in the media device receptacle 24. Any suitable retaining means may be employed to retain the cover member 20 in place with respect to the exterior cover member 19 of the top portion 18. This may include, for example, fitting the cover member 20 in a tight fit arrangement against the exterior cover member 19 to provide a water-resistant seal.

In this disclosed embodiment, cover member 20 may be retained via retaining members 22. The retaining members 22 may be attached to the surface of the exterior cover member 19. In one embodiment, the retaining members 22 may include generally outwardly extending flange portions 15 for receiving and extending across a portion of the outer circumferential edge 27 of the cover member 20. The cover member 20 may include cutouts 21 which may be aligned with the retaining members 22. The cutouts 21 may be suitably sized to clear the dimensions of the retaining members 22 such that when the cover member 20 is rotated with respect to the exterior cover member 19, the outer circumferential edge 27 of the cover member 20 may be disposed under flange portions 15 of retaining members 22 to provide a secure fit. The cover member 20 may also be rotated to realign the cutouts 21 with the retaining members 22 in order to remove the cover member 20 from the speaker device 10. It should be appreciated that any type and number of suitable retaining members 22, including, for example, screws, clamps, or other appropriate retaining devices may be utilized to retain the cover member 20 to the speaker device 10. The retaining members 22, as described herein, are for illustrative purposes and should not be conveyed to limit the described embodiment. Furthermore, other suitable retaining devices or equipment may be employed to secure the cover member 20 to the speaker device 10. This may include, for example, providing a pivot, hinge, toggle, swivel, or other suitable connection to attach the cover member 20 to the speaker device 10 (such as at the surface of the top portion 18) in order to provide a water-resistant seal.

Electronic control interfaces 26 may be disposed in the exterior cover member 19. The user interface controls 26 may be suitably configured to the electrical connector 30 and to components of the speaker system disposed, for example, in speaker section 12 in order to control functions of the speaker device 10 and the portable media player or storage device 29. These functions may include controlling menu items such as "song", "artists", and "genre" selections. Other functions may include playback option controls such as "play", "stop", "fast-forward", "rewind", "next track selection", and "previous track selection." The user interface controls 26 may also operate additional features of the speaker device 10 such as volume control.

The speaker device 10 may also include a power source. The power source may be rechargeable and, in one embodiment, include a sealed lead-acid battery disposed, for example, within the interior of the speaker device 10. The power source may serve to provide power to the speaker device 10 and may be suitably configured to power and/or charge the portable media player or storage device 29 when connected to the electrical connector 30. In one preferred embodiment, the top portion 18 of the speaker device 10 may include an electrical connection for receiving electrical signals from an exterior digital audio device. The top portion 18 may also provide one or more electrical connections for transmitting electronic signals to an exterior digital audio device. Furthermore, an electrical connection may be provided in the top portion 18 to power the speaker device 10. This may include, for example, a DC connection type electrical input. While one or more electrical connections have been described, for example, as being provided by top portion 18, additional or alternative connection types may also be provided in alternate embodiments.

By way of example, in FIG. 6, an alternative embodiment of docking station 1 is shown operatively connected to a video screen or liquid crystal display 2. The disclosed embodiment forms a video or audiovisual system 4 which may be useful for operably connecting one of a variety of portable multimedia players such as portable media player or storage devices 29 to a video screen or liquid crystal display 2. As with the docking station 1, the video or audiovisual system 4 may include one or more user interface controls 26 for controlling the functions of the portable media player or storage devices 29.

Mating with one of the portable media player or storage devices 29 may be enabled by electronically coupling, for example, an electrical connector 30 in a media device receptacle 24 of the video or audiovisual system 4 with a corresponding receptacle connector of the portable media player or storage device 29. The electrical connector 30 may be configured to transmit digital signals to and/or from the portable media player or storage device 29 and/or to power or charge the portable media player or storage device 29. This may include providing suitable materials and appropriate connection between the electrical connector 30 and a video or audiovisual system 4 including, for example, a processor (not shown) for receiving and transmitting the aforementioned digital signals accordingly. Thus video and/or audio signals may be processed and video images displayed on a video screen or liquid crystal display 2 of the video or audiovisual system 4. The video screen or liquid crystal display 2 may be mounted or housed within an exterior cover member 19. Additionally, the exterior cover member 19 for the video screen or liquid crystal display 2 may be directly connected to the docking station 1 or may be operably connected to the docking station 1 via a S-video cable, for example. Furthermore, sound waves may be emitted by left and right speakers 7, 8 disposed with in the exterior cover member 19 for the video screen or liquid crystal display 2. In one embodiment, the electrical connector 30 may include a standard electronic connector for a portable digital media player. The aforementioned standard electronic connector may include a male 30-pin connector. Thus, the electrical connector 30 may be configured to be received by a corresponding electrical female receptacle of the portable media player or storage device 29.

Figure 7:
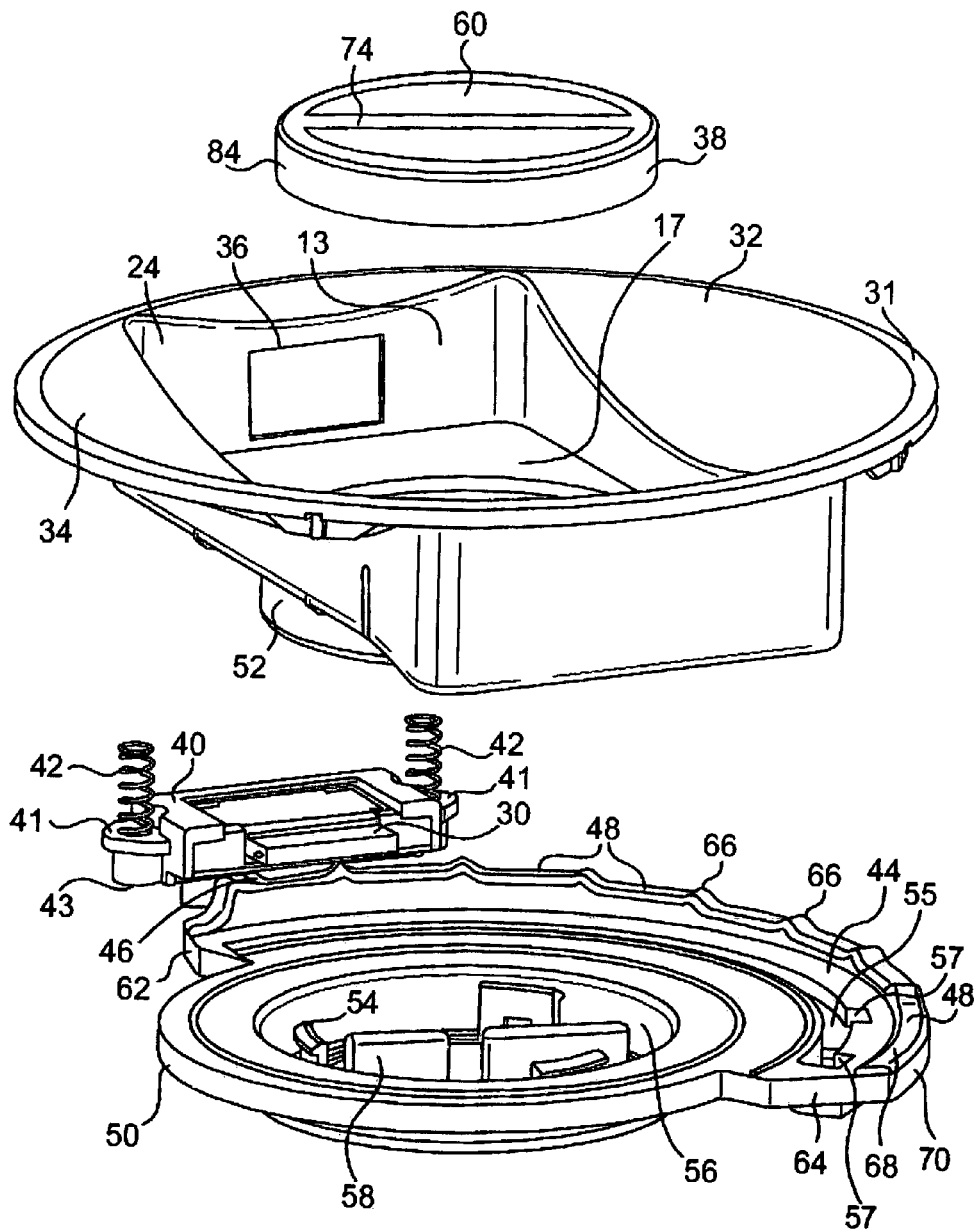
FIG. 7 provides an exploded perspective view of the receptacle housing and height adjustment mechanism of the docking station of FIG. 1.

Moreover, the video or audiovisual system 4 may comprise a housing 9 having a top portion 18. The materials of the housing 9 may generally include blow molded plastic or other suitable materials known in the art. The top portion 18 may further include an opening 23 therein. The opening 23 may be defined by an inner circumferential edge 25 and may generally provide access to a receptacle housing 32 (FIG. 7). The receptacle housing 32 may be generally disposed within the top portion 18. The receptacle housing 32 may include a media device receptacle 24 for receiving one of a variety of portable media player or storage devices 29. As shown, a portable media player or storage device 29 is disposed in the media device receptacle 24. Located therein, a cover member 20 may be fitted over the portable media player or storage device 29 and retained to the housing 9 of the docking station 1 of the video or audiovisual system 4. The disclosed embodiment shows an outer circumferential edge 27 of the cover member 20 extending past the inner circumferential edge 25 of the housing 9. In one disclosed embodiment, the cover member 20 may be completely, or at least partially, made of a transparent material to form a window. This may allow a video component of the portable media player or storage device 29 to remain visible when covered and sealed in the media device receptacle 24.

Electronic control interfaces 26 may be disposed in the top surface 18 of the housing 9. The user interface controls 26 may be suitably configured to the electrical connector 30 and to components of the video or audiovisual system 4 disposed, for example, in the docking station 1 section in order to control functions of the left and right speakers 7, 8, the video screen or liquid crystal display 2, and the portable media player or storage device 29. These functions may include controlling menu items such as "song", "artists", and "genre" selections. Other functions may include playback option controls such as "volume", "screen brightness", "screen contrast", "play", "pause", "stop", "fast-forward", "rewind", "next", and "previous".

The video or audiovisual system 4 may also include a rechargeable power source such as a sealed lead-acid battery disposed, for example, within the interior of the docking station 1 and/or exterior cover member 19 of the video or audiovisual system 4. The power source may serve to provide power to the video or audiovisual system 4 and may be suitably configured to power and/or charge the portable media player or storage device 29 when connected to the electrical connector 30. The top portion 18 of the housing 9 may also provide one or more electrical connections for transmitting electronic signals to an external video device. Furthermore, an electrical connection may be provided in the top portion 18 to power the video or audiovisual system 4. This may include, for example, a DC connection type electrical input. While one or more electrical connections have been described, for example, as being provided by top portion 18, additional or alternative connection types may also be provided in alternate embodiments.

Turning to FIG. 7, various components internal to a docking station 1 are shown in relative alignment. In a final assembly, the components illustrated therein are generally fitted together and housed within a housing 9. The receptacle housing 32 may include edge portion 31 extending from a top surface portion 34. The receptacle housing 32 may be mounted on and operatively connected to a height adjustment mechanism 50 in a mated assembly within the housing 9. The inner circumferential edge 25 (FIG. 1) of the housing 9 may extend over the edge portion 31 to retain the receptacle housing 32 in mated relationship with the height adjustment mechanism 50.

The receptacle housing 32 may include an extension member 52 for mating with a receiving portion 56 of the height adjustment mechanism 50. The height adjustment mechanism 50 may be provided with retaining clips 54 appropriately mounted within the receiving portion 56 to correspond to make contact and be retained against an interior surface of the extension member 52 as discussed below. Additionally, the height adjustment mechanism 50 may be provided with slot 55. One embodiment of the receptacle housing 32 may include one or more extensions (not shown) which may be received by insert regions 57 of slot 55. The extensions may be further received within slot 55 as height adjustment mechanism 50 is rotated relative to the receptacle housing 32. The aforementioned extensions may provide additional support to the joined assembly of the receptacle housing 32 and the height adjustment mechanism 50.

The height adjustment mechanism 50 may include a multi-tiered surface area 68, for example, generally disposed along an edge portion 70. The multi-tiered surface area 68 may include a plurality of ridge points 66 with spaced apart generally flat regions 48 disposed therebetween. The generally flat regions 48 may be appropriately sized to receive a component of a carriage assembly 40 as described below. The multi-tiered surface area 68 may be configured such that the generally flat regions 48 are stepped incrementally in height as measured from a gap top surface 44 of the height adjustment mechanism 50. Thus, the generally flat region 48, for example, located closest to one end 64 of the height adjustment mechanism 50 will be the lowest in height as measured from a distance from the gap top surface 44. The generally flat region 48 closest to an opposite end 62 of the height adjustment mechanism 50 will be the highest in height as measured from a distance of the gap top surface 44.

A carriage assembly 40 may be provided to retain the electrical connector 30. Thus, in one embodiment of a final assembly, the carriage assembly 40 may be mounted outside the receiving hole 36 of receptacle housing 32. The carriage assembly 40 may be appropriately sized and configured to allow a portion of the mounted electrical connector 30 to extend through the receiving hole 36. Thus, the electrical connector 30 may be positioned adjacent to the support surface 17. In one embodiment, this may include the electrical connector 30 extending across the support surface 17. The electrical connector 30 may be mounted and retained within the carriage assembly 40 by any suitable means. In one embodiment, the electrical connector 30 may be pivotably mounted to the carriage assembly 40 such that it may pivot relative to the carriage assembly. In a final assembly, this feature may allow the electrical connector 30 to pivot or rotate slightly upwards. This may be important in an event wherein the corresponding electrical female receptacle of the portable media player or storage device 29 is not completing cleared from the electrical connector 30. In one example, the electrical connector 30 may still be intact with the corresponding electrical female receptacle of the portable media player or storage device 29 while the user is lifting up on the portable media player or storage device 29 within the media device receptacle 24. The electrical connector 30 rotates relative to the carriage assembly 40 in an upward direction with the portable media player or storage device 29 as the portable media player or storage device 29 is moved out of the media device receptacle 24. This action may prevent shearing or damage to the electrical connector 30 as an upward force is exerted thereon.

The carriage assembly 40 may further include a contact slide surface 46. The contact slide surface 46 may generally extend from the carriage assembly 40 and slidingly engage the generally flat regions 48 and the ridge points 66 of the multi-tiered surface area 68. The carriage assembly 40 may also support a plurality of biasing members such as springs 42. In a final assembly, the springs 42 may be urged between a bottom surface 72 (FIG. 10) of the receptacle housing 32 and a mounting surface 41 (FIG. 7) of the carriage assembly 40. Thus, as the multi-tiered surface area 68 is moved relative to the contact slide surface 46 (such as via rotation of the height adjustment mechanism 50 relative to the carriage assembly 40), the contact slide surface 46 traverses the generally flat regions 48 and over ridge points 66. As the contact slide surface 46 of carriage assembly 40 contacts a respective generally flat region 48, it will achieve a corresponding height of generally flat region 48 as measured, for example, from the gap top surface 44 of the height adjustment mechanism 50. The contact slide surface 46 may be sized to fit between ridge points 66 and biased by springs 42 (via connection to carriage assembly 40) into abutment with generally flat region 48 to ensure a particular rotational position of the height adjustment mechanism 50 and the height position of electrical connector 30 is maintained. Springs 42 may be selected to provide an appropriated biasing spring force necessary to maintain contact slide surface 46 in contact with the generally flat regions 48 and ridge points 66 either at rest or during sliding movement of the height adjustment mechanism 50.

In accordance to one embodiment, the springs 42 may be disposed over mounting posts (not shown) connected to and extending from the receptacle housing 32. The mounting posts may extend through the springs 42 to contact the mounting surface 41 of the carriage assembly 40. A fastener (not shown) may be used to retain the carriage assembly 40 to the mounting posts. For example, in one embodiment, a fastener, such as a screw, may be inserted through an under-region 43 of the carriage assembly 40 and extend into a mounting post appropriately positioned on the mounting surface 41.

The height adjustment mechanism 50 may be moved, such as in rotary fashion, by appropriate corresponding movement of selector knob 38. In one disclosed embodiment, the selector knob 38 may be disposed in a portion of the support surface 17 such as in a final assembly. Additionally, the selector knob 38 may be received through the extension member 52 of the receptacle housing 32 and further aligned within the receiving portion 56 of the height adjustment mechanism 50. The height adjustment mechanism 50 may further include contact extensions 58 extending upwardly towards extension member 52 of the receptacle housing 32. One embodiment of the selector knob 38 may include a center portion 74 extending from a top surface portion 78. The selector knob 38 may include a slotted portion underneath the center portion 74 for accommodating and receiving the contact extensions 58 of height adjustment mechanism 50 in mating relationship to operatively connect selector knob 38 to height adjustment mechanism 50.

Figure 8:
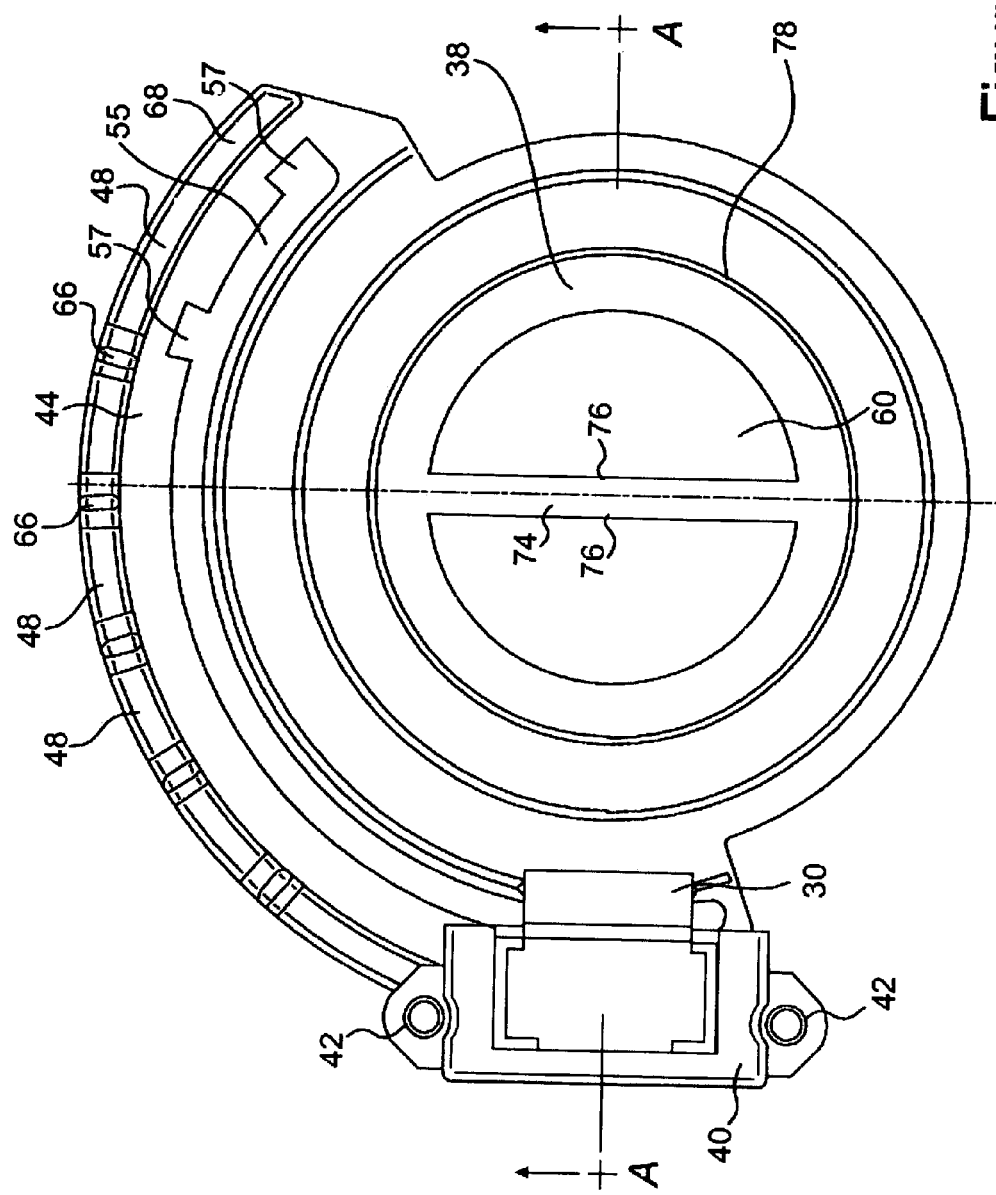
FIG. 8 provides a diagrammatic top view of a height adjustment mechanism and selector knob.

Turning to FIG. 8, the selector knob 38 is shown in alignment over the receiving portion 56 (FIG. 7) of the height adjustment mechanism 50. (For ease of viewing, the receptacle housing 32 has been omitted from the assembly.) A user may place their fingers within receiving area 60 and urge contact sides 76 of center portion 74 in rotational movement, e.g., in either a clockwise or counter-clockwise direction. The urging causes the contact extensions 58 (FIG. 7) received in the slotted region (not shown) interior to and below center portion 74 to rotate in corresponding fashion. Thus, the height adjustment mechanism 50 will also rotate as the selector knob 38 is rotated, in turn, causing the carriage assembly 40 to adjust the height of the electrical connector 30 as the carriage assembly 40 traverses the multi-tiered surface area. The vertical or height movement of electrical connector 30 may occur relative to the support surface 17. This may also allow the electrical connector 30 to be adjusted via vertical or height movement relative to a port location or position of a portable media player or storage device 29 which may be positioned, for example, on support surface 17. While one mechanism, such as selector knob 38 disposed in support surface 17, has been described to provide movement to height adjustment mechanism 50, other suitable equipment may be utilized to enable the height adjustment mechanism 50 to adjust a height of the carriage assembly 40. For example, the height adjustment mechanism 50 may be configured to move relative to the carriage assembly 40 via an extension connected thereto, wherein the extension is accessible through a side of the top portion 18.

Figure 9:
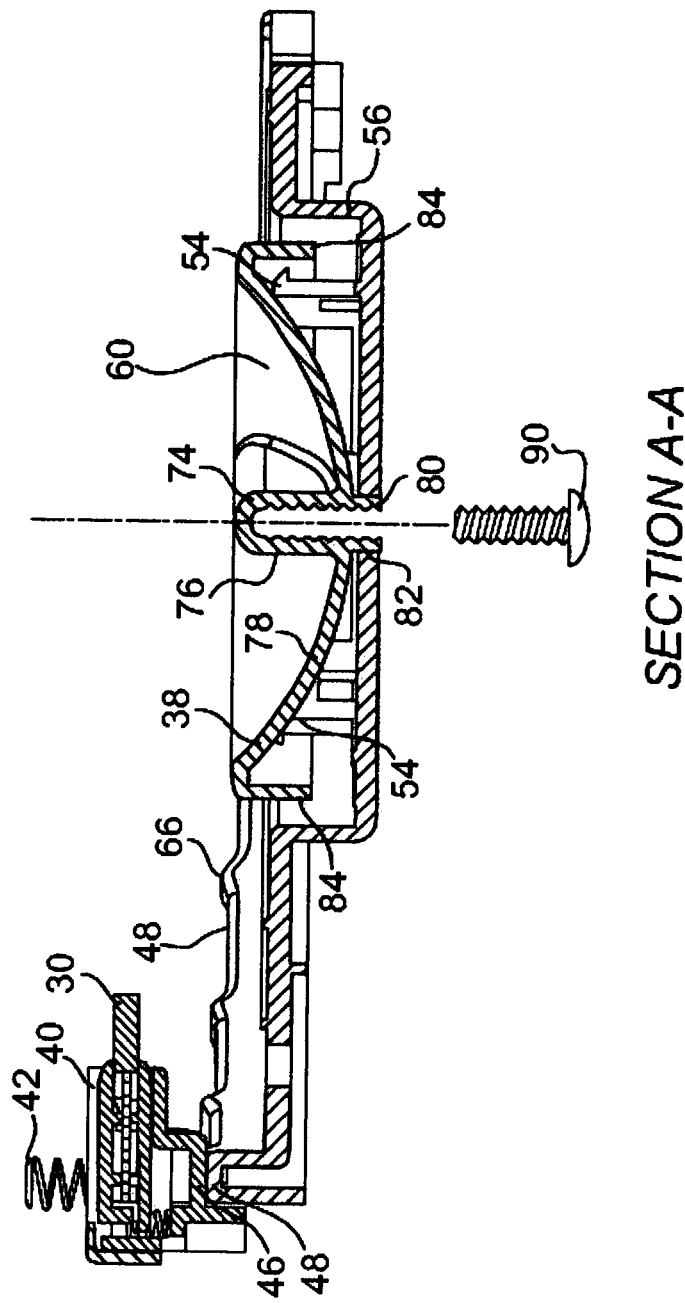
FIG. 9 provides a cross-sectional view taken along A-A in FIG. 8.

Turning to FIG. 9, the selector knob 38 is shown in mated connection with the height adjustment mechanism 50. An extension 80 of the selector knob 38 is received by alignment hole 82 of the height adjustment mechanism 50. Thus, a fastener, such as screw 90 may be inserted through extension 80 to retain the selector knob 38 within receiving portion 56 of the height adjustment mechanism 50. While a threaded engagement of the selector knob 38 is illustrated and described herein, any suitable retaining means may be utilized to retain the selector knob 38 in position with respect to the height adjustment mechanism 50.

Figure 10:
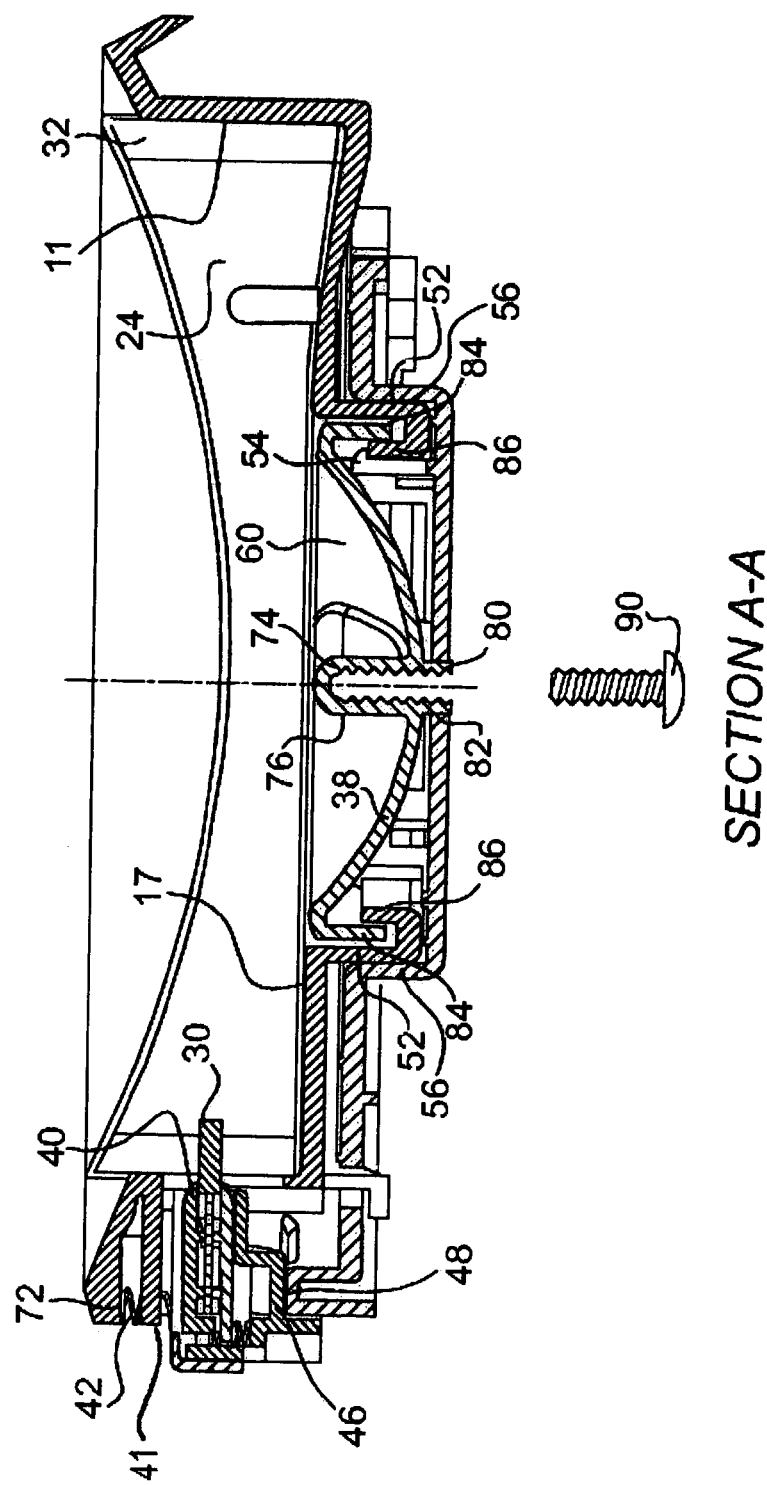
FIG. 10 provides a cross-sectional view taken along A-A in FIG. 8 including a receptacle housing according to a preferred embodiment of the invention.
Figure 11:
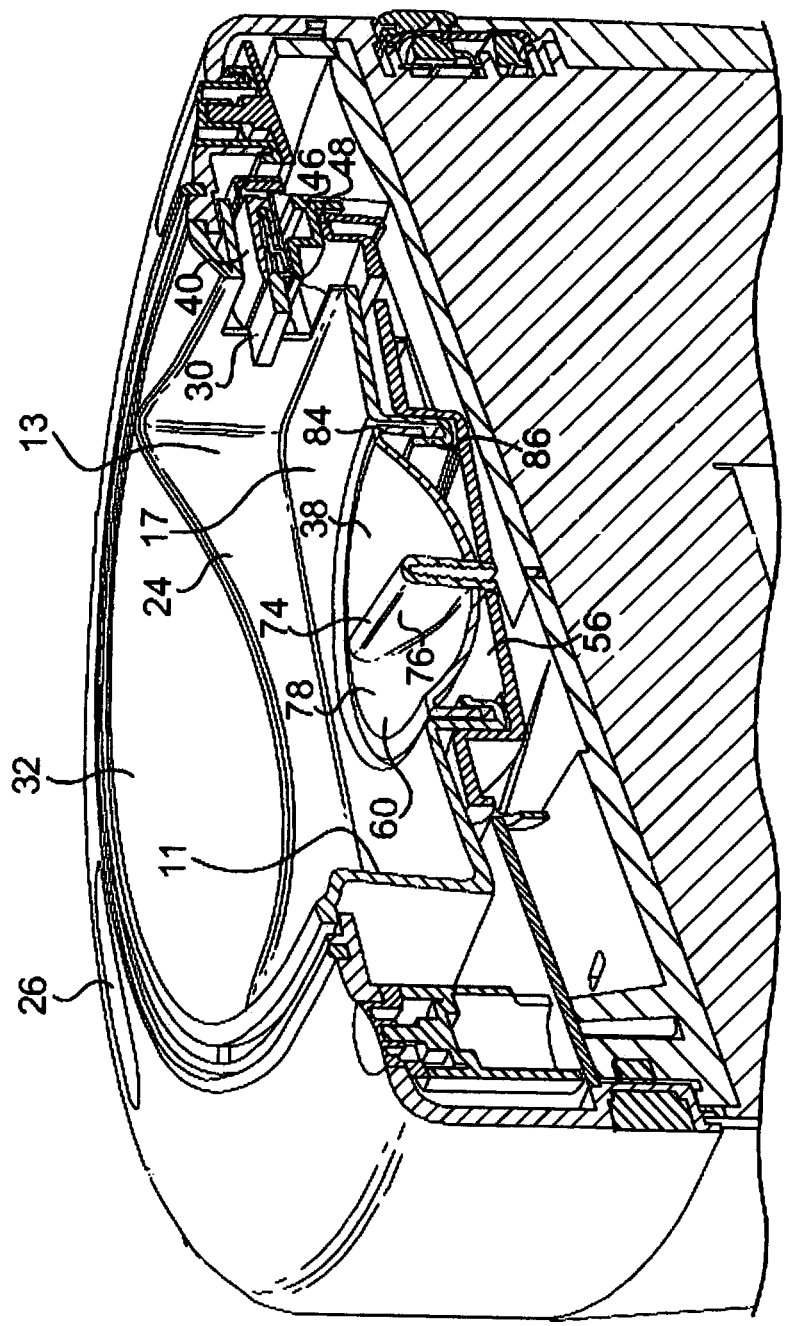
FIG. 11 provides a cross-sectional view of a portion of the docking station.
Figure 12:
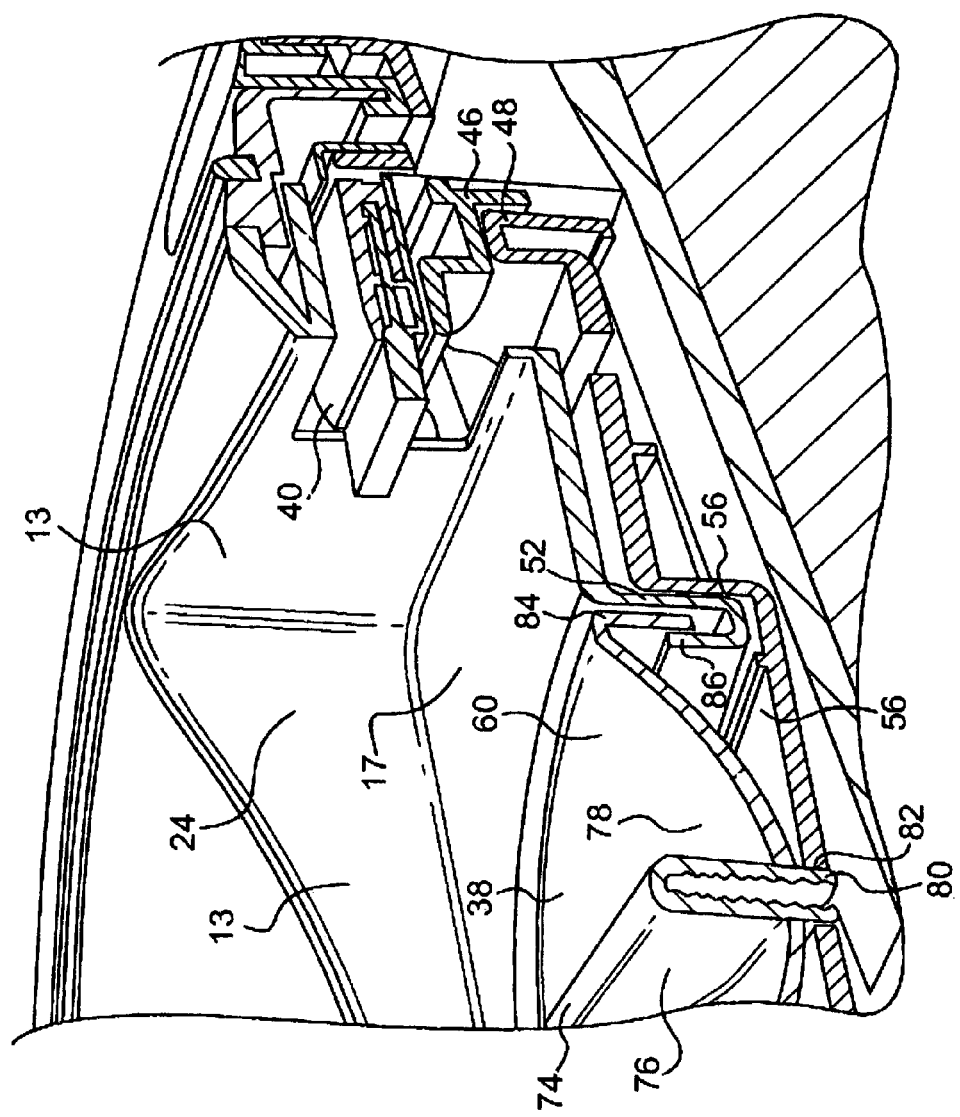
FIG. 12 provides an exploded cross-sectional view of FIG. 11.

FIG. 10-12 further illustrate assembly of the receptacle housing 32 in connection with the selector knob 38 and the height adjustment mechanism 50. One end of springs 42 is in abutment with the bottom surface 72 of the receptacle housing 32. The other end of springs 42 is in abutment with mounting surface 41 (FIG. 7) of carriage assembly 40. Thus, the springs 42 are in compression between the surfaces of the bottom surface 72 and the mounting surface 41 to bias the contact slide surface 46 against the generally flat region 48. In one embodiment, the extension member 52 of receptacle housing 32 may be configured to include an interior U-shaped recess 86. An embodiment of the selector knob 38 may include an edge portion forming a lip extension 84. The lip extension 84 is appropriately sized to be received by the interior U-shaped recess 86 of the extension member 52. The retaining clips 54 extending from within receiving portion 56 may be inserted interior to the U-shaped recess. An edge portion of the retaining clip 54 may lock over the edge of the U-shaped recess such as by snap fit. Thus, the height adjustment mechanism 50 may be retained in assembly with the receptacle housing 32.

Because the electrical connector 30 is retained by carriage assembly 40 (as previously discussed), the disclosed height adjustment of carriage assembly 40 will also provide a corresponding height adjustment to the retained electrical connector 30. Comparing, for example, FIGS. 7 and 9-12, it can be seen that moving the height adjustment mechanism 50 (such as by rotation via selection knob 38) relative to the contact slide surface 46 will cause the carriage assembly 40 to move up or down. Hence, the electrical connector 30 connected thereto will also move appropriately up and down in height. The movement of the electrical connector 30, as shown for examples in FIGS. 10-12, is thus relative to the support surface 17 of media device receptacle 24. Additionally, the movement or height adjustment of the electrical connector 30 may be described as being relative to an edge wall 13 of the support surface 17 including, for example, end wall 11 disposed opposite to a location of the electrical connector 30. It is therefore possible to alter a height of the electrical connector 30 to match a corresponding height of a receptacle port of a portable media player or storage device 29. For portable media player or storage devices 29 having different height locations of their respective receptacle connectors, the disclosed speaker device 10 may accommodate the aforementioned differences in height by adjusting the height of the electrical connector 30 as disclosed herein.

Since one disclosed embodiment includes adjusting a height of the electrical connector 30 by rotating the selector knob 38, it is therefore possible to predetermine and match a position of the selector knob 38 to correspond to a particular portable media player or storage device 29. This may be accomplished, for example, by labeling an area near the location of the selector knob 38 (such as in a final assembly). Thus the labeling of the selector knob 38 at one labeled position corresponds to a particular kind of portable media player or storage device 29 and another labeled position of the selector knob 38 corresponds to another particular kind of portable media player or storage device 29. Each labeled position will also correspond to a height of the electrical connector 30 which is automatically adjusted to a correct corresponding height for mating with a particular portable media player or storage device 29 as the selector knob 38 is adjusted. Hence, the disclosed embodiment provides an adjustable means for accommodating a variety of portable media player or storage devices 29.

INDUSTRIAL APPLICABILITY

The docking station 1 of the present disclosure may be used to provide external audio and/or video capability of a variety of to multiple users. These may include a family of portably digital media players and storage devices 29 configured in a variety of different sizes. These sizes may include differences in width, length, and height. The media device receptacle 24 of the disclosed docking station 1 is appropriately sized to accommodate a prescribed variety of portable media player or storage devices 29 and may not be limited to a particular size associated therein. This may include, for example, the iPod® family of digital audio, video, and multimedia players including the fifth generation iPod®, IPOD MINI, IPOD NANO, and IPOD SHUFFLE.

The disclosed docking station 1 may provide relatively easy connectivity and compatibility to a variety of portable media player or storage devices 29. This may reduce or eliminate additional costs associated with providing extra connectors, for example, otherwise necessary to accommodate specific portable media player or storage devices 29 which may not fit a particular docking station receptacle. Thus, the added expense and time for providing the extra connectors may be eliminated. Further, the versatility of the disclosed docking station 1 may provide an improved docking port, such as media device receptacle 24, to receive a multitude of portable media player or storage devices 29. The disclosed adjustable feature of the electrical connector 30 relative to the media device receptacle 24 may also provide increased connectivity and compatibility with different brands or models of portable media player or storage devices 29 thus providing additional functionality to the docking station 1.

It will be apparent to those skilled in the art that various modifications and variations can be made in the disclosed apparatus and method without departing from the scope of the disclosure. Additionally, other embodiments of the apparatus and method will be apparent to those skilled in the art from consideration of the specification. It is intended that the specification and examples be considered as exemplary only, with a true scope of the disclosure being indicated by the following claims and their equivalents.

LIST OF ELEMENTS

01—docking station
02—video screen or liquid crystal display
03—USB cable
04—video or audiovisual system
05—power cord
06—wireless transmitter
07—left speaker
08—right speaker
09—housing
10—portable speaker device
11—end wall
12—speaker section
13—edge wall
14—handle
15—flange portions
16—main body portion
17—support surface
18—top portion
19—exterior cover member
20—cover member
21—cutout
22—retaining member
23—depression
24—media device receptacle
25—inner circumferential edge
26—user interface control
27—outer circumferential edge
28—base portion
29—portable media player or storage device
30—electrical connector
32—receptacle housing 34—top surface portion
36—receiving hole
38—selector knob
40—carriage assembly
41—mounting surface
42—springs
43—under region
44—gap top surface
46—contact slide surface
48—generally flat region
50—height adjustment mechanism
52—extension member
54—retaining clips
55—slot
56—receiving portion
57—insert region
58—contact extensions
60—receiving area
62—opposite end
64—one end
66—ridge points
68—multi-tiered surface area
70—edge portion.
72—bottom surface
74—center portion
76—contact sides
78—top surface portion
80—extension
82—alignment hole
84—lip extension
86—interior U-shaped recess
90—screw.

What is claimed is:

1. A docking station for an electronic device comprising:
   a support surface for supporting a portable media player or storage device;
   an electrical connector positioned adjacent to the support surface, the electrical connector configured to connect to the portable media player or storage device and transmit digital signals; and
   a height adjustment mechanism for adjusting a height of the electrical connector relative to the support surface.

2. The docking station of claim 1, wherein the support surface includes an edge wall, and the height adjustment mechanism is configured to adjust a position of the electrical connector relative to said edge wall.

3. The docking station of claim 1, wherein the electrical connector comprises a male 30-pin connector type.

4. The docking station of claim 1, wherein the support surface is configured to accommodate multiple types of portable media player or storage devices having different dimensions.

5. The docking station of claim 1, further comprising:
   a carriage assembly for retaining the electrical connector, wherein the carriage assembly is configured to adjust a height of the electrical connector by engagement with the height adjustment mechanism.

6. The docking station of claim 5, further comprising:
   a selector knob operatively connected through the support surface to engage the height adjustment mechanism, said selector knob movable to cause the height adjustment mechanism to adjust the height of the carriage assembly.

7. The docking station of claim 6, wherein the rotation of the selector knob causes a corresponding rotation of the height adjustment mechanism to adjust the height of the carriage assembly.

8. The docking station of claim 5, wherein the height adjustment mechanism includes a multi-tiered surface area, a portion of the multi-tiered surface area being in sliding engagement with the carriage assembly.

9. The docking station of claim 8, wherein each tier of the multi-tiered surface area is at a different elevation from each other tier.

10. The docking station of claim 1, further comprising:
    a movable selector knob, wherein the selector knob is movable to cause the height adjustment mechanism to adjust the height of the electrical connector.

11. The docking station of claim 10, wherein the rotation of the selector knob causes a corresponding rotation of the height adjustment mechanism to adjust the height of the electrical connector.

12. An audio device, comprising:
    a housing;
    a support surface disposed within the housing;
    a first speaker disposed within the housing;
    an electrical connector extending across the support surface, the electrical connector configured to connect to a portable media player or storage device disposed on a support surface to transmit digital signals, wherein the digital signals are transmitted to the first speaker; and
    a height adjustment mechanism for adjusting a height of the electrical connector relative to the support surface.

13. The audio device of claim 12, wherein the support surface includes an edge wall and the height adjustment mechanism is operatively connected to the electrical connector to adjust a position of the electrical connector relative to said edge wall.

14. The audio device of claim 12 further comprising:
    a second speaker disposed within the housing, wherein the first speaker and the second speaker are capable of emitting sound in substantially opposite directions with respect to each other.

15. The audio device of claim 14, wherein the first speaker emits a left series of sound waves and the second speaker emits a right series of sound waves creating an acoustical stereo effect.

16. A method of connecting a portable media player or storage device to an electronic device, comprising:
    providing a support surface for supporting a portable media player or storage device;
    adjusting a first position of an electrical connector extending across the support surface by moving the electrical connector relative to the support surface;
    disposing the portable media player or storage device on the support surface; and
    connecting the portable media player or storage device to the electrical connector at the adjusted position.

17. The method of claim 16, wherein the portable media player or storage device has an electrical connector receptacle and the adjusting step includes moving the electrical connector from a first height to a corresponding height of the electrical connector receptacle.

18. The method of claim 17, wherein the connection step includes sliding the portable media player or storage device disposed on the support surface towards the electrical connector and engaging said electrical connector with said electrical connector receptacle.

19. The method of claim 16, wherein the support surface includes an edge wall, and the electrical connector is moved relative to said edge wall.

20. A speaker device, comprising:
    a housing;

a receptacle bay disposed within the housing, the receptacle bay configured to receive a portable media player or storage device therein;

an electrical connector extending into the receptacle bay area, the electrical connector configured to connect to the portable media player or storage device disposed within the receptacle bay to transmit digital signals;

a height adjustment mechanism for adjusting the height of the electrical connector relative to the receptacle bay area;

a user interface for controlling the digital signals;

a speaker assembly, said speaker assembly configured to receive audio signals from the portable media player or storage device; and a power source configured to power said portable media player or storage device.

21. The speaker device of claim 20, wherein the speaker assembly is disposed within the housing, said speaker assembly being configured to emit sound 360° around the portable speaker device.

22. An electronic system comprising:

means for receiving a portable media player or storage device disposed within the electronic system;

means for receiving digital signals configured to extend into said receiving means, said receiving means being configured to connect to said portable media player or storage device; and means for adjusting a position of said receiving means relative to said receiving means.

23. The electronic system of claim 22, wherein said receiving means comprises an electrical connector.

24. The electronic system of claim 23, wherein the adjusting means comprises a carriage assembly and a height adjustment mechanism operatively connected thereto, the carriage assembly configured to retain the electrical connector, wherein said carriage assembly engages said height adjustment mechanism to adjust a height of the electrical connector.

25. The electronic system of claim 22, further comprising: means for connecting to a speaker assembly.

26. The electronic system of claim 25, wherein the speaker assembly is disposed within the housing of the electronic system.

27. The electronic system of claim 25, wherein the speaker assembly is an audio device external to the housing.

28. The electronic system of claim 22, further comprising: means for connecting to a video assembly.

29. The electronic system of claim 28, wherein the video assembly is disposed within the housing of the electronic system.

30. The electronic system of claim 28, wherein the video assembly is a video device external to the housing.

* * * * *